Figure 1:
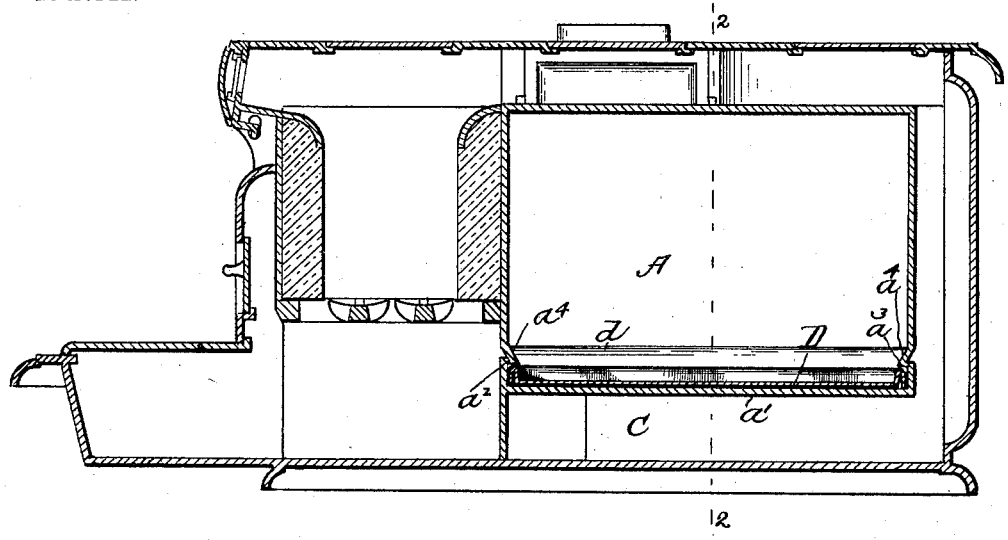

No. 737,813. PATENTED SEPT. 1, 1903.
R. H. BABBITT, Jr.
COOKING STOVE OR RANGE.
APPLICATION FILED JAN. 13, 1902.
NO MODEL.

WITNESSES INVENTOR

No. 737,813. Patented September 1, 1903.

UNITED STATES PATENT OFFICE.

ROLLIN H. BABBITT, JR., OF TAUNTON, MASSACHUSETTS, ASSIGNOR TO WEIR STOVE COMPANY, OF TAUNTON, MASSACHUSETTS, A CORPORATION OF MASSACHUSETTS.

COOKING STOVE OR RANGE.

SPECIFICATION forming part of Letters Patent No. 737,813, dated September 1, 1903.

Application filed January 13, 1902. Serial No. 89,395. (No model.)

*To all whom it may concern:*

Be it known that I, ROLLIN H. BABBITT, Jr., a citizen of the United States, and a resident of Taunton, in the county of Bristol and State of Massachusetts, have invented a new and useful Improvement in Cooking Stoves or Ranges, of which the following is a full, clear, and exact description, reference being had to the accompanying drawings, forming a part of this specification, in explaining its nature.

The invention relates especially to means for providing the ovens of cooking stoves or ranges with a hygienic bottom.

It is well known that the bottoms of ovens of stoves and ranges as now constructed and used often become dirty and foul and remain so because of the escape of the juices of cooking food upon them and because a large part of the surface is not visible from the open door and because no ready means exist for removing the scale and coating which gradually accumulates thereon. Consequently there escapes into the oven during the cooking of food more or less unhealthy steam or gas therefrom. It will be seen that this result cannot well be avoided when it is considered that the bottom of the oven is also generally the flue-plate and therefore a permanent immovable part of the stove which cannot be removed for the purpose of being cleaned.

My invention consists in providing the ovens of stoves or ranges with a bottom which is made removable. I am enabled to accomplish this because I do not use the bottom as a flue-plate. The flue-plate is still retained, but it serves the purpose merely of a flue-plate and support for the real bottom of the oven. This oven-bottom is made of metal of the full size of the oven within its walls and so as to be movable outwardly therefrom through the doorway of the oven in order that it may be removed from the oven when necessary for cleaning its surface. A movable bottom of this character is also desirable for placing articles to be cooked in the oven, for removing them from the oven, and for permitting them to be examined in the light while they are being cooked, as such articles can be placed upon the bottom when it is withdrawn or partially withdrawn from the oven, moved in by the bottom into the oven and being held upon the movable bottom may be inspected at any time by moving the movable bottom outward and can be in the same way removed from it. The said movable bottom is combined with means for holding it level when partially withdrawn from the oven and also with means for preventing juices which may fall against the sides of the oven from falling upon the flue-plate, the walls of the oven having inclines which serve to guide said escaping juices onto the bottom.

I will now describe the invention in detail in conjunction with the drawings, forming a part of this specification, wherein—

Figure 2:
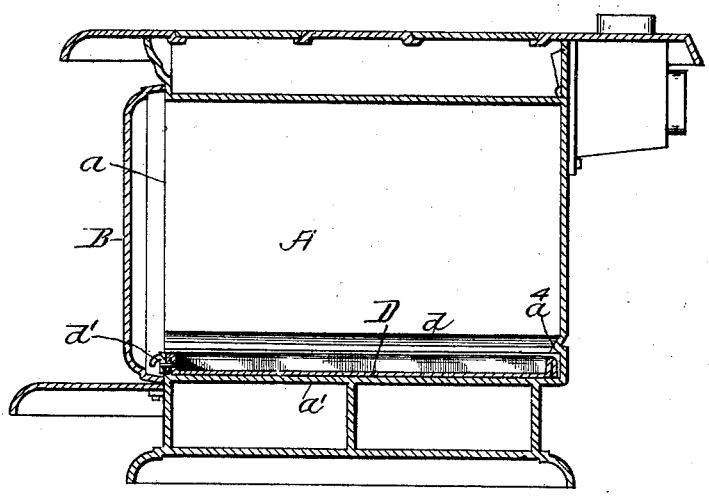

Figure 1 is a view in vertical section of a range having an oven flue-plate and movable bottom of my improved construction. Fig. 2 is a view in vertical section upon the dotted line 2 2 of Fig. 1.

The invention is applicable to any of the usual types of stoves and ranges, and it is not necessary for me to describe one in detail.

In the drawings the oven A has the usual entrance or doorway $a$, which is closed by a door B.

C is the usual flue beneath the oven and $a'$ is the flue-plate which separates the oven from it and which acts as a support for the bottom D of the oven. This bottom is made of metal, preferably sheet metal, as that provides a surface which is less readily attacked by juices than a cast-iron surface. I prefer that the oven-bottom have a raised rim $d$ about its outer edge in order that the juices which flow upon it may be retained upon its surface, and I also prefer that the bottom be of about the size of the oven and so that it may be moved upon the support $a$ through the oven-entrance out of and into its normal position upon the support in order that it may be entirely removed from the stove for the purpose of being seen and cleansed in the open at will, and also in order that it may be partially withdrawn to a position favorable to the placing of articles upon it and then with said articles moved within the oven, and also that it may be used to move articles from the oven for the purpose of inspection or for the purpose of turning on the bottom and then be returned with them to the oven, and also for the further purpose of permitting the ready removal of such articles from the oven by withdrawing them from the oven sufficiently outside it to permit them to be readily taken from the oven without danger of burning the hands or other part of the person. The movable bottom is also a desirable adjunct in that it permits the placing of an article to be cooked in that part of the oven which is best fitted for the especial kind of cooking which is desired for it.

To hold the bottom from tipping when partially withdrawn, I have arranged to extend over its side edges the horizontal shoulders $a^2$ $a^3$, which project from the side walls at a height above the support $a'$ sufficiently to provide spaces for the side edges of the bottom. These shoulders may also be arranged with an inclined upper surface $a^4$ for the purpose of directing falling juices upon the surface of the bottom and preventing them from reaching the support and flue-plate, and the rear plate of the stove may be provided with a similar inclined shoulder for this last-named purpose, and in Fig. 2 I have represented it as so equipped.

I prefer that the raised edge of the bottom be sufficiently stiff to reinforce the flat portion of the bottom within it, and for this purpose it may be folded back upon itself or doubled, as represented in Fig. 1. I also prefer that the front edge of the bottom be furnished in addition with a cast-iron plate riveted to it having formed upon it a handle $d'$ whereby the bottom may be grasped upon the opening of the oven-door and moved.

It will be seen that this invention not only provides a bottom to an oven which may be removed, cleaned, and replaced, and thus make the oven wholesome at all times and hygienic, but it also serves two other purposes—namely, as a means for assisting in the placing, handling, and removal of the food to be cooked and as a guard for maintaining the wholesomeness of the upper surface of the flue-plate, as the movable oven-bottom receives all the juices or fluids and prevents them from reaching the upper surface of the flue-plate as well.

In some instances the removable bottom may have a handle upon its back side as well as its front, and this will facilitate its use and provide a means for transferring from a table to the oven and vice versa articles to be cooked.

Having thus fully described my invention, I claim and desire to secure by Letters Patent of the United States—

1. A stove or range having a bake-oven the bottom or flue plate of which is provided with an auxiliary drip-receiving plate made to cover the bottom of the oven, and which plate has a raised rim or edge, and shoulders projecting from the walls of the oven forming guides in which the raised edges or rim of the drip-receiving plate are contained substantially as and for the purposes set forth.

2. A stove or range having a bake-oven the bottom or flue plate of which is provided with an auxiliary drip-receiving plate made to cover the bottom of the oven and having a raised rim or edge, and shoulders extending from and along the wall of the oven forming recesses in which the raised edges or rim of the drip-receiving plate are contained, which shoulders have drip-deflecting surfaces, substantially as and for the purposes set forth.

ROLLIN H. BABBITT, JR.

Witnesses:
F. F. RAYMOND, 2d,
J. M. DOLAN.